United States Patent [19]

Takanashi

[11] Patent Number: 4,756,584
[45] Date of Patent: Jul. 12, 1988

[54] SCANNING OPTICAL SYSTEM WITH IRREGULAR DEFLECTING SURFACE CORRECTION

[75] Inventor: Kenichi Takanashi, Yokohama, Japan

[73] Assignee: Ricoh Company, Ltd., Tokyo, Japan

[21] Appl. No.: 7,402

[22] Filed: Jan. 27, 1987

[30] Foreign Application Priority Data

Jan. 24, 1986 [JP] Japan .................................. 61-013320

[51] Int. Cl.[4] ...................... G02B 26/10; G02B 13/08; G02B 3/06
[52] U.S. Cl. .................................... 350/6.8; 350/420; 350/434
[58] Field of Search ................... 350/6.8, 6.7, 434, 420

[56] References Cited

U.S. PATENT DOCUMENTS

| 4,277,128 | 7/1981 | Kawamura | 350/6.8 |
| 4,571,035 | 2/1986 | Sakuma | 350/6.8 |
| 4,674,825 | 6/1987 | Tateoka et al. | 350/6.8 |

FOREIGN PATENT DOCUMENTS

| 157716 | 12/1980 | Japan | 350/6.8 |
| 132719 | 8/1983 | Japan | 350/6.8 |
| 100118 | 6/1985 | Japan | 350/6.8 |

OTHER PUBLICATIONS

IBM Journal of Research and Development, vol. 21, No. 5, Sep. 1977, "Laser-Optical System of the IBM 3800 Printer", by Fleischer et al., pp. 479-483.

*Primary Examiner*—John K. Corbin
*Assistant Examiner*—Ronald M. Kachmarik
*Attorney, Agent, or Firm*—Oblon, Fisher, Spivak, McClelland & Maier

[57] ABSTRACT

A scanning optical system includes a light source, first and second focusing optical systems, and a light deflector. The second focusing optical system serves to focus a light beam deflected by the light deflector onto a medium to be scanned. The second focusing optical system comprises a single anamorphic lens, a single spherical lens having positive refracting power, and a single lens having a toric surface, successively arranged in order from the light deflector toward the medium.

6 Claims, 10 Drawing Sheets

SCANNING OPTICAL SYSTEM WITH IRREGULAR DEFLECTING SURFACE CORRECTION

BACKGROUND OF THE INVENTION

1. Field of the Invention

The present invention relates to a scanning optical system having an ability to correct light beam deflecting surfaces which are not parallel or which lie in an irregular condition.

2. Description of the Prior Art

Various scanning optical systems for scanning a medium with a light beam are well known in the art. It is also known that the deflecting surfaces of a light deflector for deflecting the light beam in such a scanning optical system tend to be nonparallel or irregular, causing main scanning lines produced by the scanning optical system to be spaced at varying pitches or intervals. One proposal to this solution has been to use an elongated cylindrical lens for correcting the deflecting surface which is not parallel or which is irregular (see Japanese Laid-Open Patent Publication No. 50-93720).

However, the elongated cylinderical lens is not easy to manufacture, and hence a scanning optical system employing such elongated cylindrical lens is highly costly.

Where the angle of deflection of a light beam is large, the curvature of field produced by a focusing or image-formation system must be sufficiently corrected in both main scanning and subscanning directions in order to obtain a high-density beam spot diameter.

SUMMARY OF THE INVENTION

In view of the above shortcomings of the conventional scanning optical system, it is an object of the present invention to provide a scanning optical system capable of correcting deflecting surfaces which are not parallel to other deflecting surface or which lie in irregular conditions and of well correcting the curvature of field in main scanning and subscanning directions.

According to the present invention, a scanning optical system includes a light source, first and second focusing optical systems, and a light deflector. The light source may be a single light source unit or a combination of such a single light source and a converging optical system such as a collimator lens. The first focusing optical system serves to focus a light beam from the light source as a linear image. The light deflector includes a deflecting or reflecting surface rotatable or angularly movable for deflecting a light beam. The deflecting surface is positioned in the vicinity of the linear image formed by the first focusing optical system. The light deflector may comprise a rotating polygonal mirror or a swinging mirror such as a galvanometer mirror. However, the present invention is articularly effective when used with a rotating polygonal mirror.

The second focusing optical system serves to focus the light beam deflected by the light deflector onto a medium to be scanned. The second focusing optical system, in which the principles of the invention are incorporated, comprises a single anamorphic lens, a single spherical lens having positive refracting power, and a single lens having a toric surface, successively arranged in order from the light deflector toward the medium. The anamorphic lens has a spherical lens surface (entrance surface) facing toward the light deflector and a cylindrical surface (exit surface) facing toward the medium. The anamorphic lens is a plano-concave lens in a plane in which the light beam is deflected by the light deflector, and a double-concave lens in a direction normal to such a plane. The lens having a toric surface is a plano-convex lens in the plane in which the light beam is deflected by the light deflector, and a meniscus convex lens in the direction normal to the plane.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
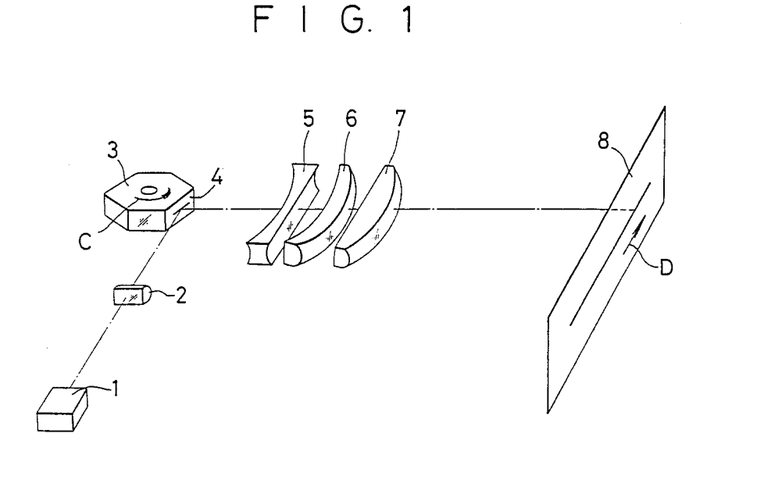
FIG. 1 is a perspective view of a scanning optical system according to the present invention.

As shown in FIG. 1, a scanning optical system according to the present invention includes a light source 1 comprising a light source unit only or a light source unit and a condensing system such as a collimator lens for producing a parallel-ray light beam. The light beam produced by the light source 1 is caused by a first focusing or image-formation optical system or cylinderical lens 2 to be focused as a linear image.

A light deflector or rotating polygonal mirror 3 has a plurality of deflecting or reflecting surfaces 4, and is positioned such that the deflecting surfaces 4 are successively positionable in the vicinity of the linear image focused by the cylindrical lens 2 when the polygonal mirror 3 is rotated about its own axis in the direction of the arrow C.

Between the rotating polygonal mirror 3 and a medium 8 for example, such as a photoconductive photosensitive sensitive body to be scanned, there are disposed three lenses 5, 6, 7 which jointly constitute a second focusing or image-formation optical system. The lenses 5, 6, 7 are successively arranged in order from the rotating polygonal mirror 3. The lens 5 is a single anamorphic lens having a spherical lens surface (entrance surface) facing toward the rotating polygonal mirror 3 and a cylindrical surface (exit surface) facing toward the medium 8. The anamorphic lens is a plano-concave lens in a plane in which the light beam is deflected by the rotating polygonal mirror 3, and a double-concave lens in a direction normal to such a plane. The lens 6 is a single spherical lens having positive refracting power. The lens 7 is a single lens having a toric surface. The lens 7 is a plano-convex lens in the plane in which the light beam is deflected by the rotating polygonal mirror 3, and a meniscus convex lens in the direction normal to the plane.

The three single lenses 5, 6, 7 serve to focus a light beam deflected by the rotating polygonal mirror 3 as a spot on the medium 8. The focused spot scans the medium 8 upon rotation of the polygonal mirror 3.

Figure 2:
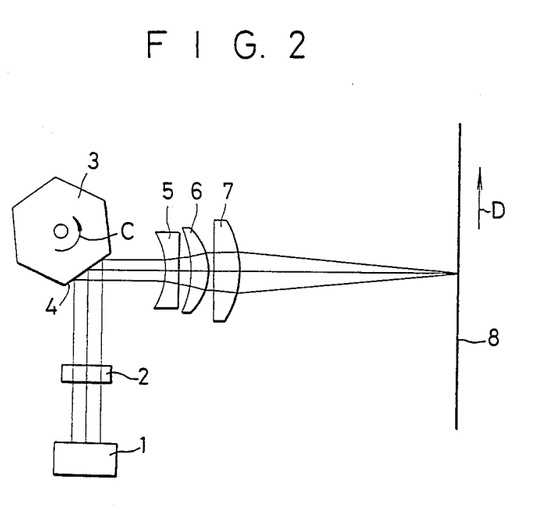
FIG. 2 is a plan view of the scanning optical system of FIG. 1.

FIG. 2 shows the scanning optical system as viewed along the axis of rotation of the polygonal mirror 3, with the plane in which the light beam is deflected lying parallel to the sheet of FIG. 2.

The parallel-ray light beam from the light source 1 first passes through the cylinderical lens 2 and falls on one of the deflecting surfaces 4 of the polygonal mirror 3. Then, the light beam is deflected by the deflecting surface 4 to pass successively through the lenses 5, 6, 7, by which the light beam is focused as a spot on the medium 8. As the polygonal mirror 3 rotates in the direction of the arrow C, the light beam is deflected by the polygonal mirror 3 to optically scan the medium 8 in the direction of the arrow D (main scanning direction). The second focusing optical system has an $f\theta$ function for optically scanning the medium 8 at a constant speed.

Figure 3:
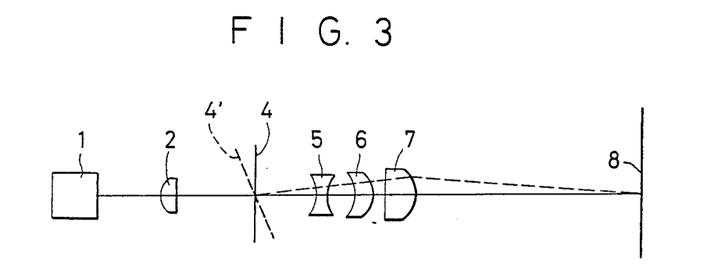
FIGS. 3 and 4 are side elevational views of the scanning optical system.
Figure 4:
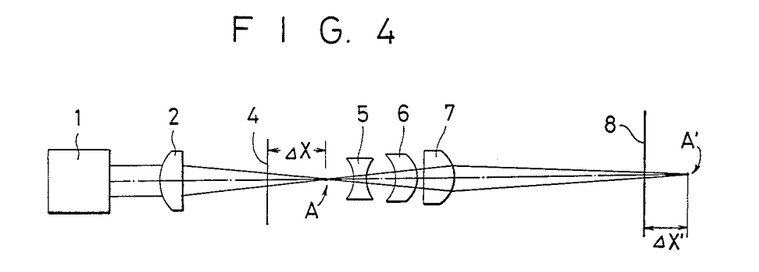

In FIG. 3, the optical scanning system of FIG. 1 is developed along the optical path and viewed in the plane of deflection of the light beam. The vertical direction of FIG. 3 corresponds to a subscanning direction. The parallel-ray light beam from the light source 1 is caused by the cylindrical lens 2 to be focused as a linear image in the vicinity of the deflecting surface 4, the linear image extending in a direction normal to the sheet of FIG. 3. The refracting power of the lenses 5, 7 in the plane lying on the sheet of FIG. 3 is different from the refracting power of the lenses 5, 7 in the plane of deflection. In the plane lying on sheet of FIG. 3, each of the lenses 5, 6, 7 is arranged such that the deflecting surface 4 and the meduim 8 are positioned in substantially conjugate relationship. Therefore, even when a deflecting surace 4' is not parallel with the other deflecting surfaces lies in an irregular condition as the polygonal mirror 3 rotates, the focused position of the deflected light beam on the medium 8 remains substantially unchanged in the subscanning direction.

When the polygonal mirror 3 used as the light deflector is rotated, the position of the deflecting surface 4 and the linear image A focused by the cylindrical lens 2 are deviated from each other by $\Delta x$. This deviation x produces a deviation $\Delta x'$ between an image A' of the linear image A and the scanned surface of the medium 8.

Assuming that the lenses 5, 6, 7 have linear magnification $\beta$, the deviations $\Delta x$, $\Delta x'$ have the following relationship:

$$\Delta x' = \beta^2 \Delta x \tag{1}$$

Figure 5:
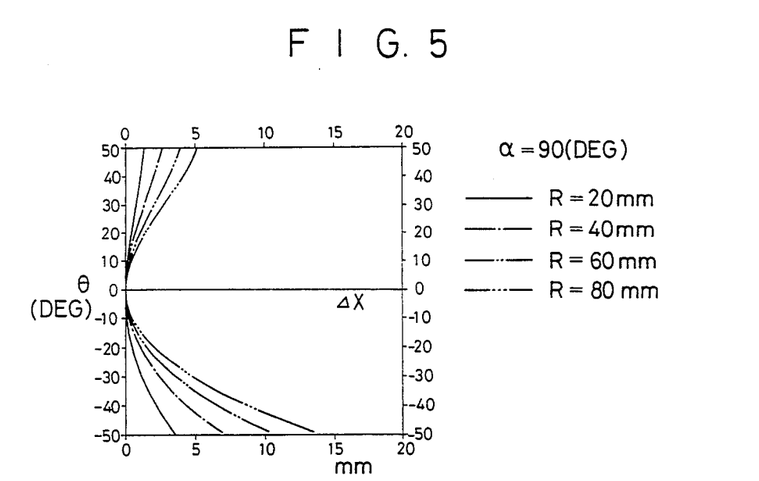
FIGS. 5 and 6 are diagrams explaining a deviation between a deflectihg surface and a linear image formed by a cylindrical lens.

FIG. 5 shows the relationship between the deviation $\Delta x$ and an angle $\theta$ formed between the central light ray of the deflected light beam and the optical axis of the lenses 5, 6, 7 within the plane of deflection. In FIG. 5, R designates a parameter equal to the radius of an inscribed circle of the polygonal mirror 3, and $\alpha$ an angle formed between the central light ray of the light beam applied to the deflecting surface 4 and the optical axis of the lenses 5, 6, 7.

Figure 6:
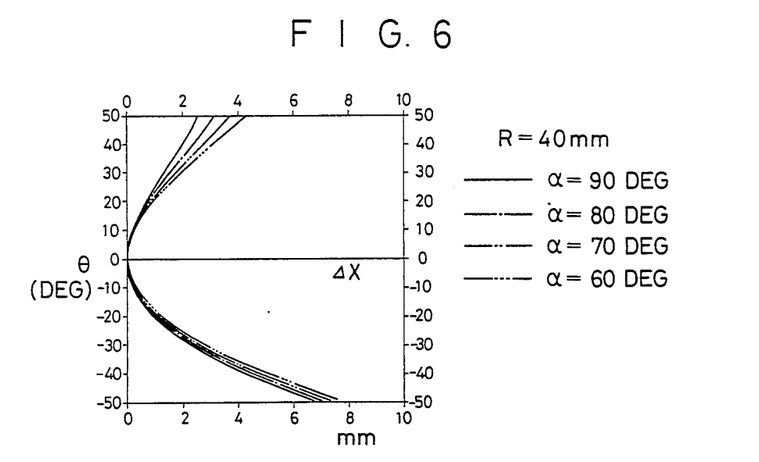

FIG. 5 clearly indicates that the deviation $\Delta x$ is larger as the radius R of the inscribed circle of the polygonal mirror 3. The deviation $\Delta x$ also varies with the angle $\alpha$ as shown in FIG. 6.

Where a galvanometer mirror is employed as the light deflector, any variation corresponding to $\Delta x$ is produced since the axis of angular movement of the deflecting surface lies on the deflecting surface.

However, where the rotating polygonal mirror is used, the variation $\Delta x$ is caused and the linear image is positionally changed in a direction normal to the variation $\Delta x$. More specifically, as the polygonal mirror rotates, the position in which the linear image is focused by the cylindrical lens 2 (the first focusing optical system) is two-dimensionally moved generally in an asymmetric pattern with respect to the optical axis of the second focusing optical system (the lenses 5, 6, 7).

Thus, in the case where the rotating polygonal mirror is used as the light deflector, it is necessary to correct the curvature of field well in both main scanning and subscanning directions, and the scanning speed is required to be well constant.

Figure 7:
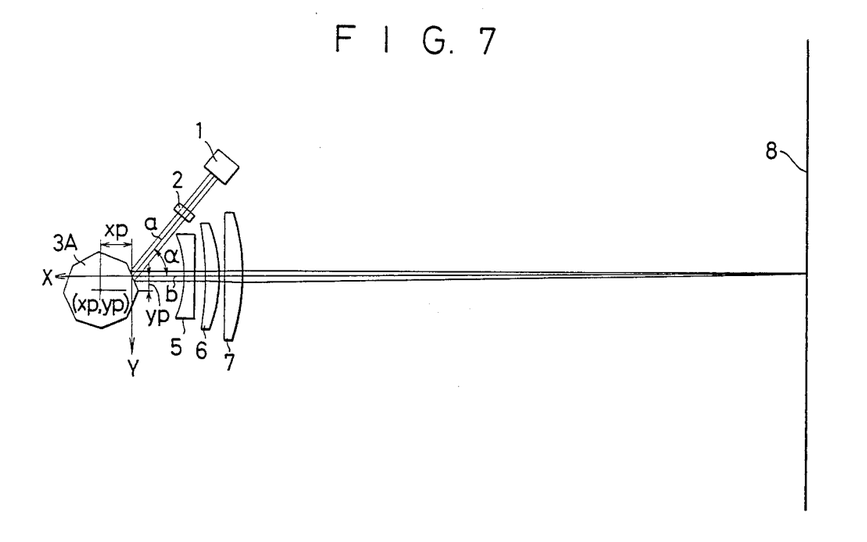
FIG. 7 is a plan view of another scanning optical system of the invention.

In the arrangement of FIG. 1, the angle $\alpha$ formed between the central light ray of the light beam emitted from the light source 1 and the optical axis of the second focusing optical system is shown as 90°, and the number N of deflectng surfaces or mirrors 4 is 6. FIG. 7 shows a more general scanning optical system in which the angle $\alpha$ is smaller than 90° and the number N of deflecting surfaces or mirrors is 8. The description thus far equally applies irrespective of the number N of deflecting mirrors.

Designated in FIG. 7 at a is the central light ray of the light beam emitted from the light source 1, and b is the optical axis of the lenses 5, 6, 7 or the second focusing optical system. The angle formed between the central light ray of the light beam deflected by a rotating polygonal mirror 3A and the optical axis b is denoted by $\theta$, as described above.

In FIG. 7, an X-Y coordinate system is established which has its origin at the intersection of the central light ray a and the optical axis b, an X-axis aligned with the optical axis b, and a Y-axis normal to the X-axis within the plane of deflection. Now, assuming that the axis of rotation of the rotating polygonal mirror 3A has coordinates $(x_p, y_p)$ in the X-Y coordinate system, the following conditions must be met:

$$\theta < \alpha < 4\pi/N - \theta \tag{2}$$

$$0 \leq x_p \leq R \cos \alpha/2 \tag{3}$$

$$0 \leq y_p \leq R \sin \alpha/2 \tag{4}$$

The lower limit of the condition (2) means that the central light ray a is outside of the effective deflecting range. The upper limit of the condition (2) is to position, outside of the effective scanning range, a ghost image formed by light scattered from the medium 8 and reflected by the deflecting surface of the polygonal mirror 3A.

Denoted by R in the conditions (3), (4) is the radius of the inscribed circle of the polygonal mirror. These conditions (3), (4) serve to minimize the deviation $\Delta x$ (FIGS. 5 and 6) between the linear image and the deflecting surface. According to the present invention, the curvature of field can be well corrected in the main scanning and subscanning directions throughout the entire effective scanning range over the medium being scanned.

Specific Examples of the lenses 5, 6, 7 serving as the second focusing optical system will be given below. In each of Examples, $\Delta$ and R indicate the angle formed between the central light ray a and the optical axis and the radius of the inscribed circle of the polygonal mirror, θ the deflection angle, and f the combined focal length of the lenses 5, 6, 7 in a plane parallel to the plane of deflection.

Also denoted at r1 through r6 are radii of curvature, in order from the light deflector or polygonal mirror, of the lenses 5, 6, 7 in a plane parallel to the plane of deflection. Thus, r1 represents the radius of curvature of the entrance surface of the lens 5, and r6 represents the radius of curvature of the exit surface of the lens 7. Similarly, denoted at r1′ through r6′ are radii of curvature, in order from the light deflector, of the lenses 5, 6, 7 in a plane normal to the plane of deflection. The thicknesses of the lenses 5, 6, 7 on the optical axis are designated by d1, d3, d5, respectively. The distances between the lenses 5, 6 and between the lenses 6, 7 are designated by d2, d4, respectively. The refractive indexes of the lenses 5, 6, 7 are indicated by n1, n2, n3, respectively.

EXAMPLE 1

| f = 100, 2θ = 52° R/f = 7.43, α = 50° | | | |
|---|---|---|---|
| r1 = −20.993 | r1′ = −20.993 | d1 = 2.23 | n1 = 1.51118 |
| r2 = ∞ | r2′ = 13.515 | d2 = 2.23 | |
| r3 = −65.406 | r3′ = −65.406 | d3 = 3.12 | n2 = 1.51118 |
| r4 = −31.812 | r4′ = −31.812 | d4 = 1.04 | |
| r5 = ∞ | r5′ = −112.996 | d5 = 4.01 | n3 = 1.76605 |
| r6 = −38.062 | r6′ = −10.526 | | |

EXAMPLE 2

| f = 100, 2θ = 52° R/f = 7.43, α = 50° | | | |
|---|---|---|---|
| r1 = −20.993 | r1′ = −20.993 | d1 = 2.23 | n1 = 1.51118 |
| r2 = ∞ | r2′ = 5.352 | d2 = 2.23 | |
| r3 = −65.406 | r3′ = −65.406 | d3 = 3.12 | n2 = 1.51118 |
| r4 = −31.812 | r4′ = −31.812 | d4 = 1.04 | |
| r5 = ∞ | r5′ = −498.074 | d5 = 4.01 | n3 = 1.76605 |
| r6 = −38.062 | r6′ = −9.471 | | |

EXAMPLE 3

| f = 100, 2θ = 52° R/f = 7.43, α = 50° | | | |
|---|---|---|---|
| r1 = −20.993 | r1′ = −20.993 | d1 = 2.23 | n1 = 1.51118 |
| r2 = ∞ | r2′ = 9.218 | d2 = 2.23 | |
| r3 = −65.406 | r3′ = −65.406 | d3 = 3.12 | n2 = 1.51118 |
| r4 = −31.812 | r4′ = −31.812 | d4 = 1.04 | |
| r5 = ∞ | r5′ = −182.875 | d5 = 4.01 | n3 = 1.76605 |
| r6 = −38.062 | r6′ = −10.214 | | |

EXAMPLE 4

| f = 100, 2θ = 52° R/f = 8.92, α = 50° | | | |
|---|---|---|---|
| r1 = −20.993 | r1′ = −20.993 | d1 = 2.23 | n1 = 1.51118 |
| r2 = ∞ | r2′ = 14.868 | d2 = 2.23 | |
| r3 = −65.406 | r3′ = −65.406 | d3 = 3.12 | n2 = 1.51118 |
| r4 = −31.812 | r4′ = −31.812 | d4 = 1.04 | |
| r5 = ∞ | r5′ = −112.996 | d5 = 4.01 | n3 = 1.76605 |
| r6 = −38.062 | r6′ = −10.653 | | |

EXAMPLE 5

| f = 100, 2θ = 52° R/f = 8.92, α = 50° | | | |
|---|---|---|---|
| r1 = −20.901 | r1′ = −20.901 | d1 = 2.23 | n1 = 1.51118 |
| r2 = ∞ | r2′ = 20.829 | d2 = 2.23 | |
| r3 = −64.27 | r3′ = −64.27 | d3 = 3.12 | n2 = 1.51118 |
| r4 = −31.701 | r4′ = −31.701 | d4 = 1.04 | |
| r5 = ∞ | r5′ = −81.235 | d5 = 4.02 | n3 = 1.76605 |
| r6 = −37.835 | r6′ = −10.675 | | |

EXAMPLE 6

| f = 100, 2θ = 52° R/f = 8.92, α = 50° | | | |
|---|---|---|---|
| r1 = −20.901 | r1′ = −20.993 | d1 = 2.23 | n1 = 1.51118 |
| r2 = ∞ | r2′ = 11.903 | d2 = 2.23 | |
| r3 = −64.273 | r3′ = −64.27 | d3 = 3.12 | n2 = 1.51118 |
| r4 = −31.701 | r4′ = −31.701 | d4 = 1.04 | |
| r5 = ∞ | r5′ = −126.762 | d5 = 4.02 | n3 = 1.76605 |
| r6 = −37.835 | r6′ = −10.37 | | |

EXAMPLE 7

| f = 100, 2θ = 52° R/f = 8.92, α = 50° | | | |
|---|---|---|---|
| r1 = −20.901 | r1′ = −20.901 | d1 = 2.23 | n1 = 1.51118 |
| r2 = ∞ | r2′ = 8.927 | d2 = 2.23 | |
| r3 = −64.27 | r3′ = −64.27 | d3 = 3.12 | n2 = 1.51118 |
| r4 = −31.701 | r4′ = −31.701 | d4 = 1.04 | |
| r5 = ∞ | r5′ = −177.795 | d5 = 4.02 | n3 = 1.7665 |
| r6 = −37.835 | r6′ = −10.102 | | |

EXAMPLE 8

| f = 100, 2θ = 65° R/f = 9.46, α = 80° | | | |
|---|---|---|---|
| r1 = −20.993 | r1′ = −20.993 | d1 = 2.23 | n1 = 1.51118 |
| r2 = ∞ | r2′ = 9.459 | d2 = 2.23 | |
| r3 = −65.406 | r3′ = −65.406 | d3 = 3.14 | n2 = 1.51118 |
| r4 = −31.816 | r4′ = −31.816 | d4 = 0.95 | |
| r5 = ∞ | r5′ = −268.634 | d5 = 5.30 | n3 = 1.76605 |
| r6 = −38.372 | r6′ = −10.821 | | |

EXAMPLE 9

| f = 100, 2θ = 65° R/f = 9.46, α = 80° | | | |
|---|---|---|---|
| r1 = −20.993 | r1′ = −20.993 | d1 = 2.23 | n1 = 1.51118 |
| r2 = ∞ | r2′ = 11.351 | d2 = 2.23 | |
| r3 = −20.993 | r3′ = −65.406 | d3 = 3.14 | n2 = 1.51118 |
| r4 = −20.993 | r4′ = −31.816 | d4 = 0.95 | |
| r5 = ∞ | r5′ = −196.746 | d5 = 5.30 | n3 = 1.76605 |
| r6 = −20.993 | r6′ = −11.01 | | |

EXAMPLE 10

| f = 100, 2θ = 65° R/f = 9.46, α = 80° | | | |
|---|---|---|---|
| r1 = −20.993 | r1′ = −20.993 | d1 = 2.23 | n1 = 1.51118 |
| r2 = ∞ | r2′ = 20.81 | d2 = 2.23 | |
| r3 = −65.406 | r3′ = −65.406 | d3 = 3.14 | n2 = 1.51118 |
| r4 = −31.816 | r4′ = −31.816 | d4 = 0.95 | |
| r5 = ∞ | r5′ = −104.427 | d5 = 5.30 | n3 = 1.76605 |

-continued

| f = 100, 2θ = 65° |
| --- |
| R/f = 9.46, α = 80° |

| r6 = −38.372 | r6' = −11.426 | | |
| --- | --- | --- | --- |

EXAMPLE 11

| f = 100, 2θ = 65° |
| --- |
| R/f = 9.46, α = 80° |

| r1 = −20.993 | r1' = −20.993 | d1 = 2.23 | n1 = 1.51118 |
| --- | --- | --- | --- |
| r2 = ∞ | r2' = 30.269 | d2 = 2.23 | |
| r3 = −65.406 | r3' = −65.406 | d3 = 3.14 | n2 = 1.51118 |
| r4 = −31.816 | r4' = −31.816 | d4 = 0.95 | |
| r5 = ∞ | r5' = −85.13 | d5 = 5.30 | n3 = 1.76605 |
| r6 = −38.372 | r6' = −11.578 | | |

EXAMPLE 12

| f = 100, 2θ = 52° |
| --- |
| R/f = 9.46, α = 80° |

| r1 = −20.993 | r1' = −20 | d1 = 2.01 | n1 = 1.51118 |
| --- | --- | --- | --- |
| r2 = ∞ | r2' = 30.269 | d2 = 2.65 | |
| r3 = −65.406 | r3' = −65.406 | d3 = 3.14 | n2 = 1.51118 |
| r4 = −32.081 | r4' = −32.081 | d4 = 0.38 | |
| r5 = ∞ | r5' = −61.673 | d5 = 5.3 | n3 = 1.76605 |
| r6 = −38.174 | r6' = −10.821 | | |

EXAMPLE 13

| f = 100, 2θ = 52° |
| --- |
| R/f = 9.46, α = 80° |

| r1 = −20.993 | r1' = −20.993 | d1 = 2.01 | n1 = 1.51118 |
| --- | --- | --- | --- |
| r2 = ∞ | r2' = 11.351 | d2 = 2.65 | |
| r3 = −65.406 | r3' = −65.406 | d3 = 3.14 | n2 = 1.51118 |
| r4 = −32.081 | r4' = −32.081 | d4 = 0.38 | |
| r5 = ∞ | r5' = −102.157 | d5 = 5.3 | n3 = 1.76605 |
| r6 = −38.174 | r6' = −10.367 | | |

Figure 8:
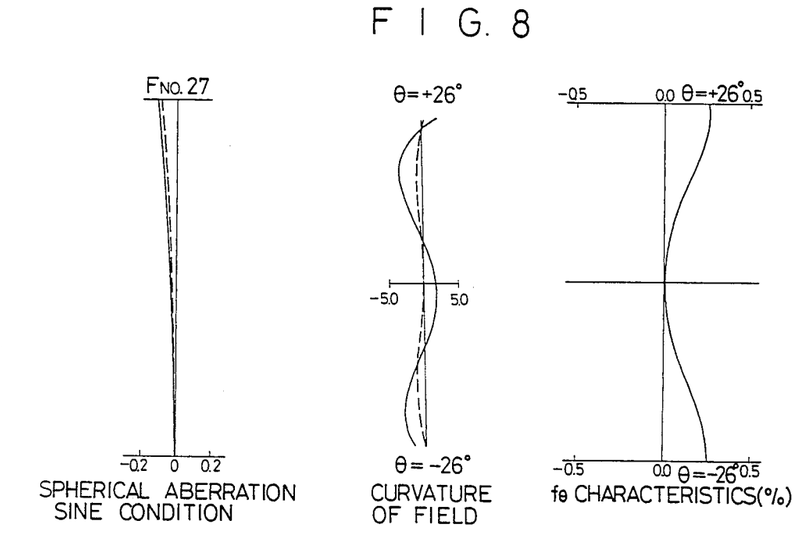
FIGS. 8 through 20 are diagrams showing aberrations.
Figure 9:
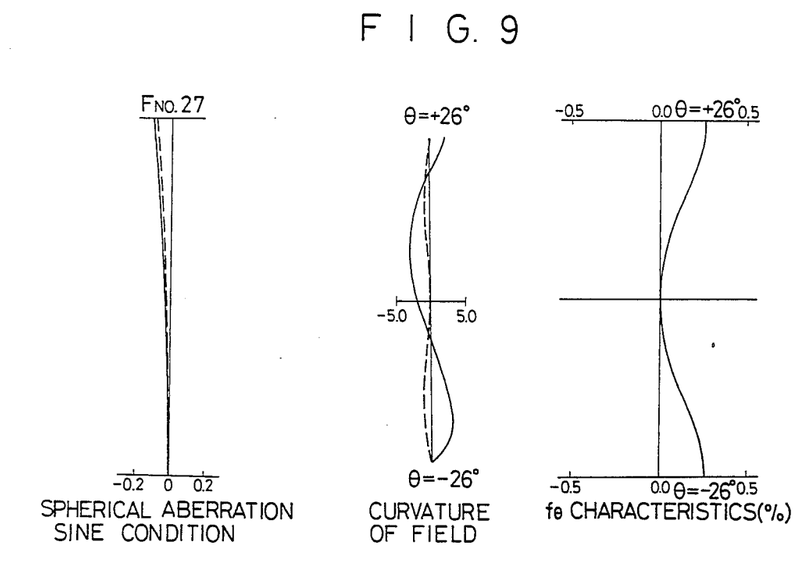
Figure 10:
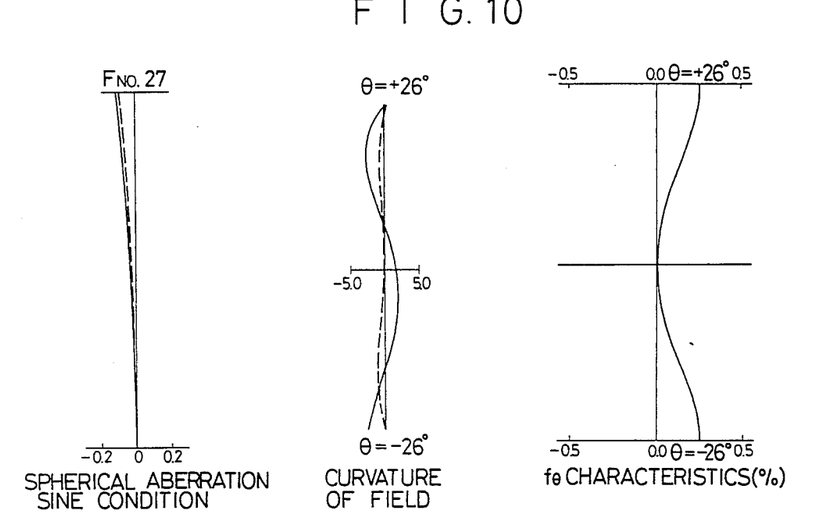
Figure 11:
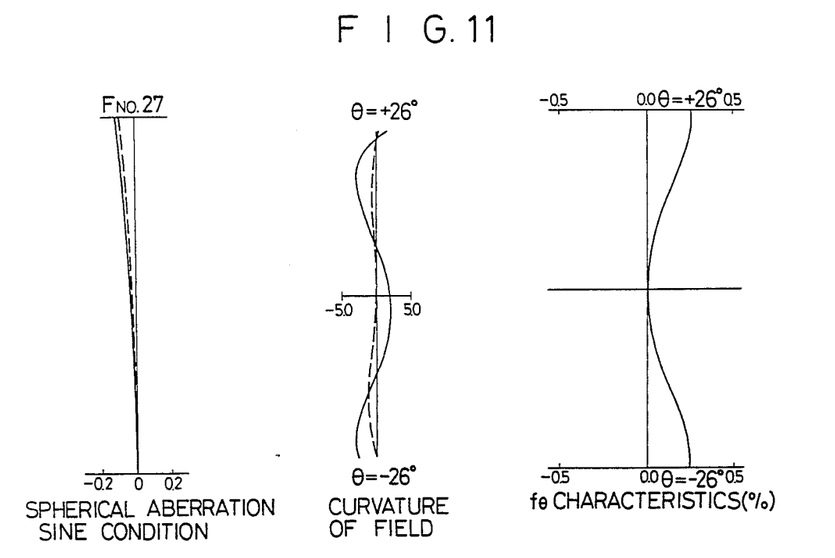
Figure 12:
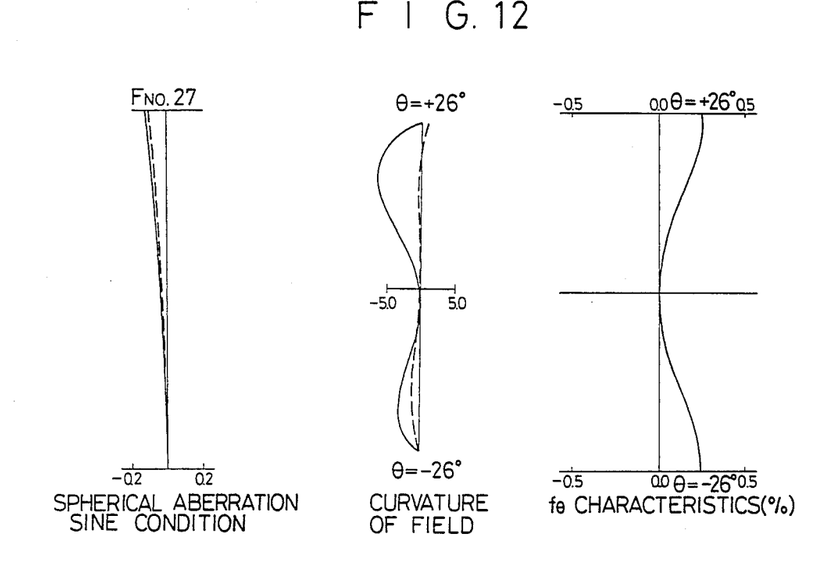
Figure 13:
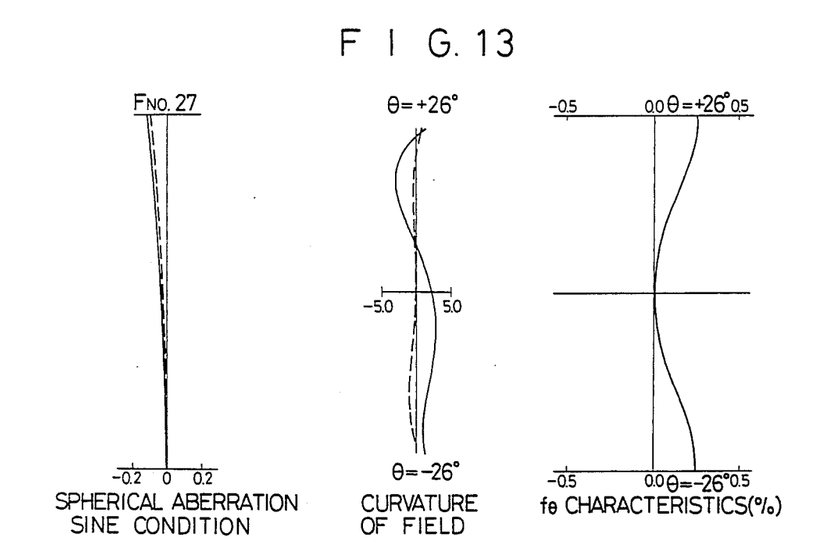
Figure 14:
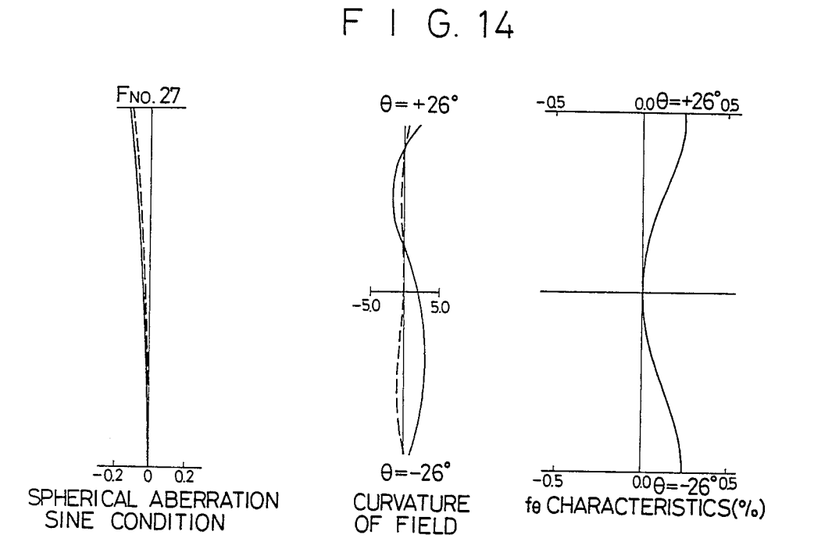
Figure 15:
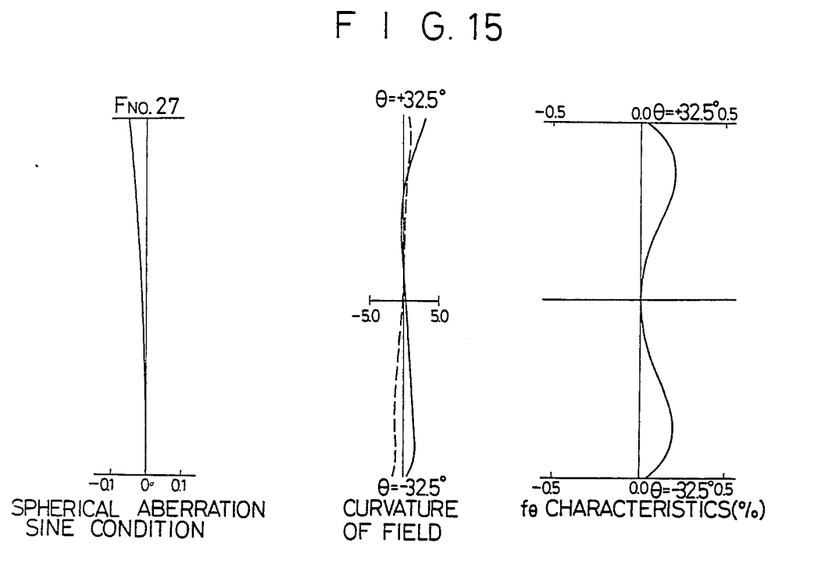
Figure 16:
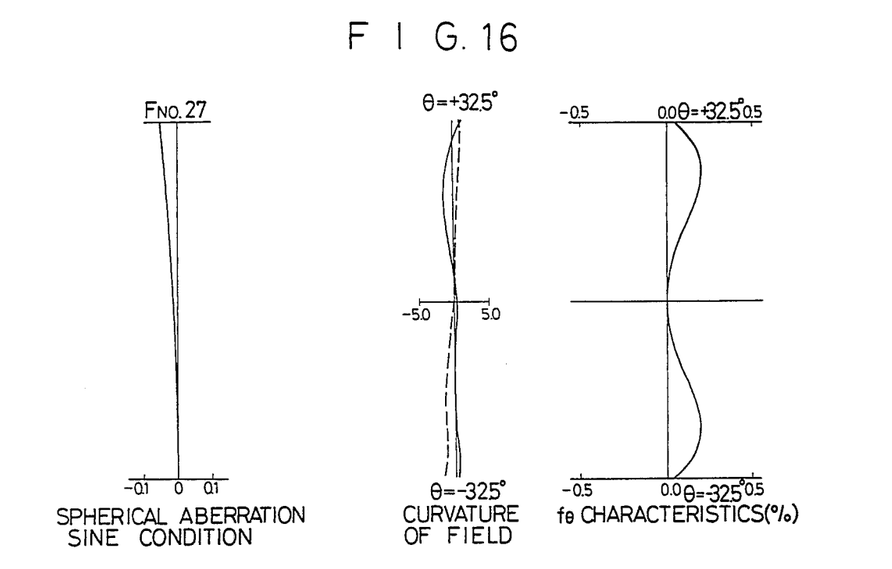
Figure 17:
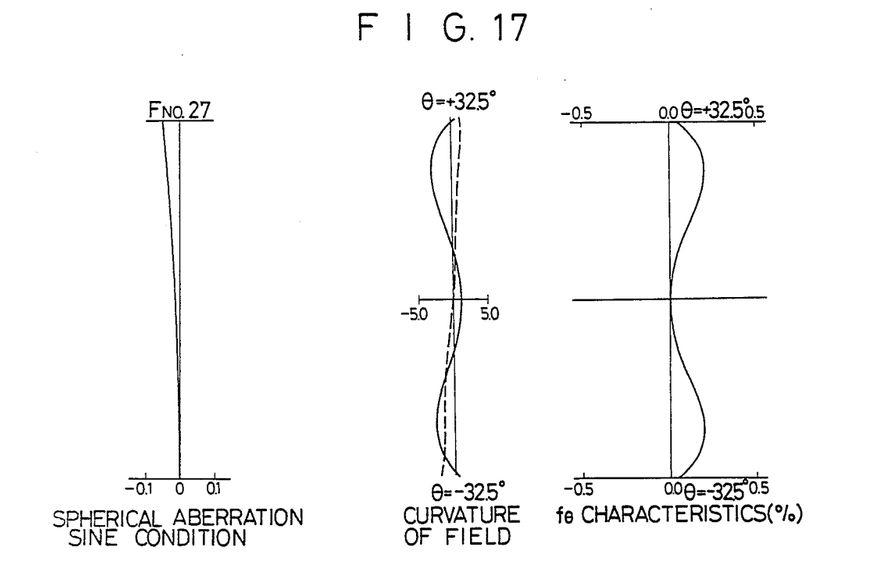
Figure 18:
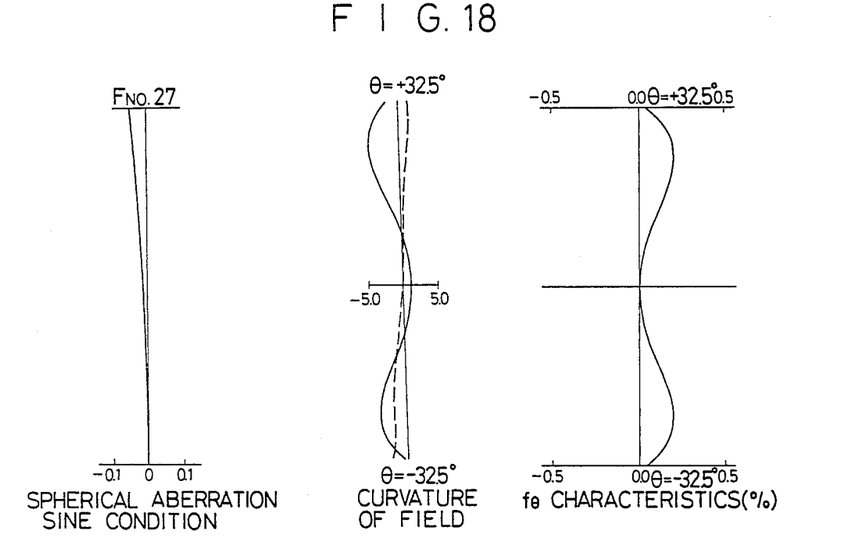
Figure 19:
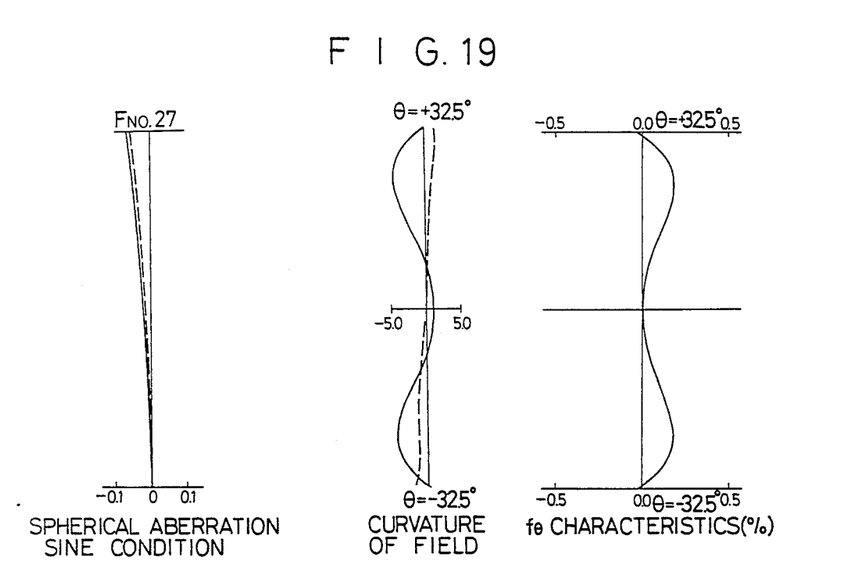
Figure 20:
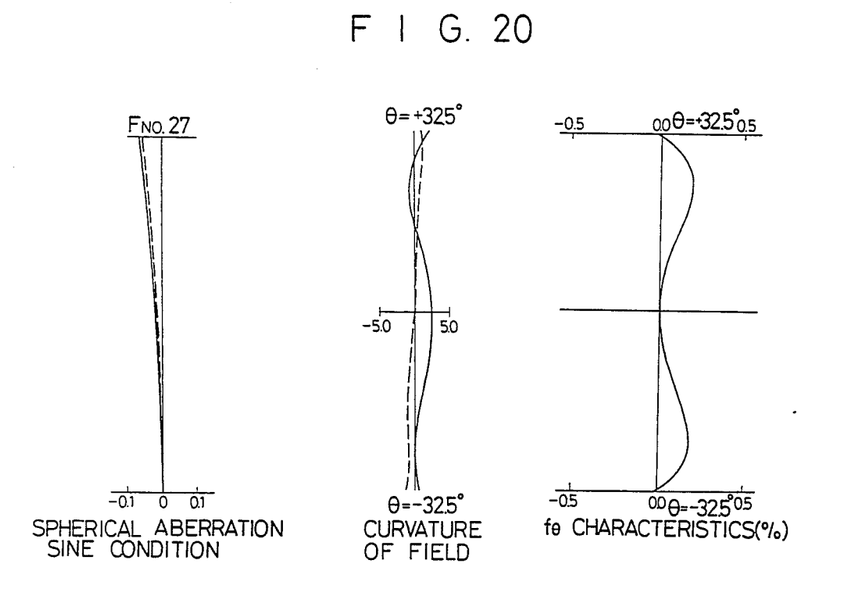

FIG. 8 shows aberrations of Example 1. In the curvature of field, the solid-line curve indicates an image in the subscanning direction, and the broken-line curve indicates an image in the main scanning direction. The fθ characteristics are a quantity indicating the uniformity of the speed of the main scanning, and is represented by:

fR characteristics = h' − f·θ/f·θ × 100 (%)

The curvature of field and the fθ characteristics are indicated for the entire deflection range in order to exhibit asymmetry for variations of the light beam applied by the light deflector to the second focusing optical system.

In FIG. 8, the spherical aberration and the sine condition are indicated by the solid-line curve and the broken-line curve, respectively.

FIGS. 9 through 20 are illustrative of aberrations of Examples 2 through 13, respectively.

FIGS. 8 through 14 illustrate aberrations when f=672.0, and FIGS. 15 through 20 illustrate aberrations when f=264.0.

With the arrangement of the present invention, the second focusing optical system disposed between the light deflector and the medium to be measured includes one toric surface, two cylindrical surfaces, and three spherical surfaces, so that nonparallel or irregular deflecting surfaces can be corrected without using an expensive cylindrical lens, and the curvature of field can be well corrected in the main scanning and subscanning directions. While in the above embodiments the rotating polygonal mirror is employed as the light deflector, the light deflector may instead comprise a galvanometer mirror.

Although certain preferred embodiments have been shown and described, it should be understood that many changes and modifications may be made therein without departing from the scope of the appended claims.

I claim:

1. A scanning optical system capable of correcting deflecting surface irregularity, comprising:
    a light source for emitting a light beam;
    a first focusing optical system for focusing the light beam as a linear image;
    a light deflector having a deflecting surface in the vicinity of the linear image formed by said first focusing optical system, for deflecting the light beam from said first focusing optical system; and
    a second focusing optical system for focusing the light beam deflected by said light deflector onto a medium to be scanned, said second focusing optical system comprising a single anamorphic lens, a single spherical lens having positive refracting power, and a single lens having a toric surface, successively arranged in order from said light deflector toward said medium.

2. A scanning optical system according to claim 1, wherein said lenses of the second focusing optical system are arranged such that said deflecting surface and said medium are positioned in conjugate relationship in a plane normal to the plane in which the light beam is deflected by said light deflector.

3. A scanning optical system according to claim 1, wherein the angle formed between the central light ray of the light beam emitted from said light source and the optical axis of said second focusing optical system is 90°.

4. A scanning optical system according to claim 1, wherein the angle formed between the central light ray of the light beam emitted from said light source and the optical axis of said second focusing optical system is smaller than 90°.

5. A scanning optical system according to claim 1, wherein said light deflector comprises a rotating polygonal mirror having N deflecting surfaces and rotatable about an axis having coordinates (xp, yp) in an X-Y coordinate system having an origin at the intersection of the central light ray of the light beam emitted from said light source and the optical axis of said second focusing optical system, an X-axis aligned with the optical axis of said second focusing optical system, and a Y-axis normal to said X-axis in a plane normal to the plane in which the light beam is deflected by said light deflector, the following conditions being met:

$$\theta < \alpha < 4\pi/N - \theta$$

$$0 \leq xp \leq R \cos \alpha/2$$

$$0 \leq yp \leq R \sin \alpha/2$$

wherein θ is the angle formed between the central light ray of the light beam deflected by said light deflector and the optical axis of said second focusing optical system within the plane in which the light beam is deflected by said light deflector, α is the angle formed between the central light ray of the light beam emitted from said light source and the optical axis of said second focusing optical system, and R is the radius of the inscribed circle of said rotating polygonal mirror.

6. A scanning optical system according to claim 1, wherein said anamorphic lens has a spherical lens surface facing toward said light deflector and a cylindrical surface facing toward said medium, said anamorphic lens being a plano-concave lens in the plane in which the light beam is deflected by said light deflector, and a double-concave lens in a direction normal to said plane, and wherein said lens having a toric surface is a plano-convex lens in said plane and a meniscus convex lens in said direction.

* * * * *